United States Patent [19]

Inoue

[11] 4,399,083

[45] Aug. 16, 1983

[54] METHOD AND APPARATUS FOR MAKING A COMPOSITE CARBON MATERIAL

[75] Inventor: Kiyoshi Inoue, Tokyo, Japan

[73] Assignee: Inoue-Japax Research Incorporated, Yokohama, Japan

[21] Appl. No.: 302,794

[22] Filed: Sep. 16, 1981

[30] Foreign Application Priority Data

Sep. 25, 1980 [JP] Japan .................. 55-133607

[51] Int. Cl.³ .............................................. B06B 3/00
[52] U.S. Cl. .................................. 264/23; 264/29.1;
264/29.3; 423/449; 425/174.2; 425/174.6
[58] Field of Search ............... 264/23, 27, 29.1, 29.3;
423/448, 449; 425/174.2, 174.6

[56] References Cited

U.S. PATENT DOCUMENTS

| | | | |
|---|---|---|---|
| 3,084,394 | 4/1963 | Bickerdike et al. | 264/29 |
| 3,092,437 | 6/1963 | Carter et al. | 264/29.1 |
| 3,184,353 | 5/1965 | Balamuth et al. | 264/23 |
| 3,283,040 | 11/1966 | Stover | 264/29.1 |
| 3,396,214 | 8/1968 | Crandon | 264/23 |
| 3,499,808 | 3/1970 | Obeda | 264/23 |
| 4,117,051 | 9/1978 | Ishikawa et al. | 264/29.1 |
| 4,192,064 | 3/1980 | Kennedy | 264/23 |
| 4,201,777 | 5/1980 | Inoue | 423/448 |
| 4,225,569 | 9/1980 | Matsui et al. | 264/29.1 |

FOREIGN PATENT DOCUMENTS

647766  9/1962  Canada.

Primary Examiner—Donald E. Czaja
Assistant Examiner—W. Thompson
Attorney, Agent, or Firm—Karl F. Ross; Herbert Dubno

[57] ABSTRACT

A method of and an apparatus for making a composite carbon material from a precompact of granular carbons of different kinds or origins. A localized region of the carbon precompact is subjected to simultaneous heating by electric current flow from a current source at a temperature of 1800° to 3500° C. and pressurization at a pressure of 500 to 5000 kg/cm², both being applied preferably impulsively. The localized region subjected to the simultaneous heating and pressurization is displaced so as to be controlledly crystallized and to control the formation of crystalline vacancies therein.

16 Claims, 1 Drawing Figure

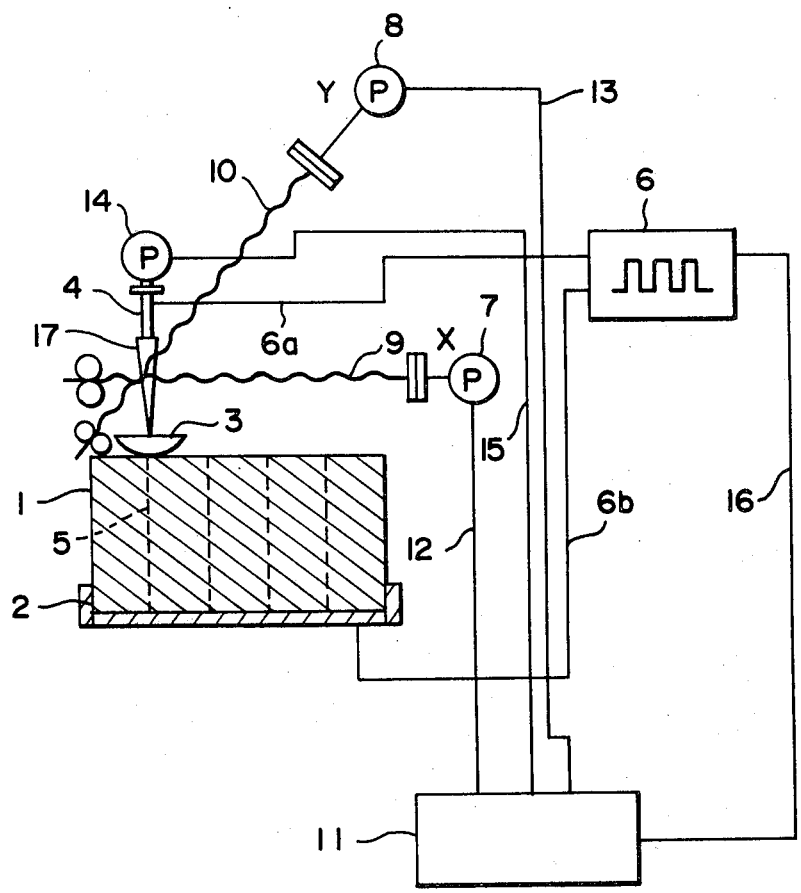

METHOD AND APPARATUS FOR MAKING A COMPOSITE CARBON MATERIAL

FIELD OF THE INVENTION

The present invention relates to a composite carbon material having portions of and apparatus for different crystalline structures and, more particularly, to a method of making such a composite carbon material.

BACKGROUND OF THE INVENTION

It is known that carbon materials exhibit different properties depending on their origins and on their particular manners of treatment. Fundamental property variations are presented where their degrees of crystallization change. It has been recognized to be important, therefore, to choose carbon of a particular origin and to achieve a preselected degree of crystallization depending on a particular use of the carbon prepared. A particular need exists to provide a particular carbon material in which the whole body is uniformly crystallized, one in which a particular portion of the body is crystallized as desired or one in which carbons of different origins are mixed and the mixture is uniformly crystallized. Depending on particular uses, carbons must be of sufficient density, must be oriented in multiple directions, must have suitable vacancies in crystallized structures, and must have internal structures in an activated state. In certain instances, some portions of a given carbon material should desirably have been crystallized to an increased degree and be continuous with other portions which are crystallized to the same or different degree or even should be non-crystalize. It is extremely desirable to develop a method whereby a carbon material of any one of these characters can be selectively prepared.

OBJECTS OF THE INVENTION

It is, accordingly, an important object of the present invention to provide a novel method of making a composite carbon material which enables a composite carbon material of any desirable crystallization distribution to be obtained.

Another object of the invention is to provide an apparatus for carrying out the novel method.

Other objects of the invention will become apparent as the following description.

SUMMARY OF THE INVENTION

In accordance with the present invention, in a first aspect thereof, there is provided a method of making a composite carbon material, which method comprises: (a) forming a carbon precompact consisting essentially of carbon granules of preselected different origins or kinds; (b) heating a localized region of the carbon precompact at a tempeature between 1800° and 3500° C. while pressurizing the localized region of the carbon precompact under a pressure of 500 to 5000 kg/cm$^2$ in at least one direction; and (c) displacing in a scanning manner the localized region of the precompact subjected to simultaneous heating and pressurization so as to controlledly crystallize the region and to control the formation of crystalline vacancies therein.

In accordance with a specific preferred feature of this aspect of the invention, an increased proportion of such vacancies in the material may be provided by applying the pressure in an impulsive fashion and possibly also the heat in a like manner to the composite carbon precompact. Conversely, the proportion of the vacancies in the material can be reduced or practically eliminated by controlledly applying an ultrasonic vibration energy to the composite carbon precompact under pressurization at the pressure. This can also be achieved by periodically reducing the pressure applied to the carbon precompact at an ultrasonic frequency.

Carbon materials prepared according to the invention can advantageously be utilized as a mechanical seal material, atomic utilization material, refractory material, nozzle material, jig material, active carbon and other materials.

During steps (b) and (c), the carbon precompact is advantageously placed in an aqueous vapor atmosphere.

Furthermore, the application of the pressure during step (c) is advantageously switched successively from one direction to another while the carbon precompact is kept heated at a temperature of 3000° to 3500° C. so that the orientation of crystals formed is controlled as desired. It has been found that this enables the expansion coefficient of the formed carbon material to be variably adjusted with ease.

The invention also provides, in a second aspect thereof, an apparatus for making a composite carbon material, which apparatus comprises: means for retaining a carbon precompact of carbon granules of preselected different kinds or origins; means for heating a localized region of the carbon precompact at a temperature between 1800° and 3500° C.; pressure means for pressurizing the localized region of the carbon precompact under a pressure of 500 kg/cm$^2$ to 5000 kg/cm$^2$ while the carbon precompact is being heated by the heating means; and drive means for displacing, in a scanning manner, the pressure means to displace the localized region of the precompact under simultaneous heating and pressurization so as to controlledly crystallize the region and to control the formation of crystalline vacancies therein.

BRIEF DESCRIPTION OF THE DRAWING

These and other features of the present invention as well as advantages thereof will become more readily apparent from the following description, reference being made to the accompanying drawing in which:

The sole FIGURE is a schematic view illustrating a method of and an apparatus for making a composite carbon material according to the invention.

SPECIFIC DESCRIPTION

In the FIGURE, a composite carbon precompact in the form of a block consisting of carbon granules of preselected different origin, e.g. thermal grains (i.e. soot or carbon black), bag grains (i.e. filter-bag-collectible grains), artificial graphite grains, petroleum coke particles and coal coke particles, is placed upon a table 2 and retained thereby. A pressure member 3 supported by a shaft 4 is disposed in engagement with the block 1 to apply a pressure of 500 to 5000 kg/cm$^2$ to a localized region thereof, the pressure being effectively exerted on a portion shown by a broken line 5. A power supply 6 is provided for heating the block 1 and has a pair of output terminals 6a and 6b connected to the shaft 4 and the table 2, respectively, to pass the heating current directly through the block 1 along the line 5. The heating current is preferably in the form of a succession of electrical pulses as indicated or may alternatively be an impulsive current. The block 1 is heated locally at a temperature of 1800° to 2200° C. or 3000° to 3500° C., or in the range between 1800° and 3500° C. in general.

The shaft 4 for the pressure member 3 is displaceable along an X-axis and a Y-axis orthogonal to the X-axis by an X-axis pulse motor 7 and a Y-axis pulse motor 8 drivingly coupled to the shaft 4 via drive screws 9 and 10, respectively. The motors 7 and 8 are energized with drive signals furnished from a control unit 11 via conductors 12 and 13, respectively. The control unit 11 has preprogrammed data therein which are reproduced to result in the drive signals for the motors 7 and 8 which displace the shaft 4 and the pressure member 3 along a predetermined path on the surface of the block 1.

A further motor 14 is associated with the shaft 4 to drive the pressure member 3 against the block 1 on the table 2 along a Z-axis orthogonal to the X- and Y-axes to apply to the block 1 a pressure of 500 to 5000 kg/cm$^2$ in the direction of the Z-axis. The motor 14 ia energized with drive signals again furnished from the control unit 11 along a conductor 15.

One or more additional pressure members (3) may be provided together with associated shafts (4) and drive motors (14) to pressurize the block 1 in the direction of X-axis or Y-axis or in both directions besides in the Z-axis direction.

The control unit 11 also provides a heating control signal which is applied via a conductor 16 to the power supply 6.

A portion of the shaft 4 is here constituted by an ultasonic horn 17 coupled to an electromechanical transducer (not shown) energized by a power supply (not shown) to apply ultrasonic vibrations to a localized region of the block 1 which region is placed under pressurization by the pressure member 3. The ultrasonic vibrations may be of a frequency between 15 and 50 kHz.

EXAMPLE

Carbon precompacts each of 10 grams consisting esentially of carbon granules of different origins listed in Table 1 below and mixed in different proportions listed in Table 2 below are prepared.

TABLE 1

| Origin (Kind) | Thermal grains | Bag grains | Artificial graphite grains | Petroleum coke particles | Coal coke particles |
|---|---|---|---|---|---|
| Symbol | A | B | C | D | E |
| Average grain (particle) size | 0.1 μφ | 1.7 μφ | 3.0 μφ | 10.0 μφ | 14.0 μφ |

Note:
petroleum-pitch binder grains (−150 mesh) are mixed for each of A−E in a proportion of 15% by weight.

TABLE 2

| Precompacts | Proportions (weight) |
|---|---|
| No. 1 | 1 Part A + 1 Part B + 1 Part C |
| No. 2 | 1 Part B + 1 Part C + 3 Parts D |
| No. 3 | 3 Parts B + 1 part D + 1 Part E |

These precompacts when uniformly sintered in the conventional manner show densities, hardnesses and strengths (tensile) as indicated in Table 3 below.

TABLE 3

| Precompacts | Density (gr/cc) | Hardness (Hs) | Intensity (kg/cm$^2$) |
|---|---|---|---|
| No. 1 | 1.580 | 85 | 406 |
| No. 2 | 1.736 | 84 | 422 |
| No. 3 | 1.898 | 48 | 511 |

These precompacts when uniformly sintered in the conventional manner show densities, hardnesses and strengths (tensile) as indicated in Table 3 below.

Such precompacts are treated according to the invention. To this end, a succession of electrical pulses of a peak current Ip of 3300 amperes, an open-circuit voltage of 3000 volts and a pulse duration of 80 microseconds and a pressure of 3 tons/cm$^2$ are applied sequentially to six spaced-apart regions of each of the precompacts Nos. 1, 2 and 3. The densities, hardnesses and strengths of the treated precompacts are measured and shown in Table 4 below.

TABLE 4

| Precompacts | Density (gr/cc) | Hardness (Hs) | Intensity (kg/cm$^2$) |
|---|---|---|---|
| No. 1 | 1.72 | 72 | 720 |
| No. 2 | 1.83 | 68 | 880 |
| No. 3 | 1.92 | 56 | 1120 |

Micrographical examination of the bodies Nos. 1, 2 and 3 treated in the manner according to the invention shows that each body has portions varying in the size of graphite crystals from other portions. Thus, the marked improvements in physical properties of the embodiment shown in Table 4 over the prior art shown in Table 3 have been shown to be attributed to this modified body structure.

In general, it has been found that the area of the modified crystalline structure should occupy at least 15% and preferably in excess 30% of the total carbon body.

It has been found in general that a favorable modified crystalline structure is obtained by impulsively applying heat and/or pressure to a localized region of a precompact of carbon granules of different origins and displacing the localized region in a scanning manner. This results in a controlled crystallization of the region displaced and a controlled formation of crystalline vacancies therein. The heating temperature should also be maintained precisely at a value between 1800° and 3500° C. adapted for the particular combination of carbon granules of different origin to complete graphitization.

It has also been found to be desirable to apply an ultrasonic vibrational energy to a carbon precompact being heated at a temperature of 1800° to 3500° C. and preferably also under pressurization to reduce or eliminate the crystalline vacancies when undesirable, thereby homogenizing the internal structure of the carbon material.

A carbon material with a multiplicity of crystalline vacancies according to the invention can advantageously be used as, for example, an active carbon and a mechanical seal material. A carbon material with crystalline vacancies reduced or eliminated according to the invention can advantageously be used as a sliding-contact conducting brush material, a seal material, an atomic furnace material, a general-purpose refractory material, a jig material and a variety of other materials. Typical composite carbon materials according to the invention shown in Table 4 are seen to have densities slightly higher than those treated by the conventional technique but to have any one of a variety of hardnesses according to a particular proportion of carbon granules of different origins and to possess a markedly increased strength over those conventionally sintered.

Furthermore, the body may additionally be controlled as to its microscopic crystal orientation, thereby eliminating its macroscopic orientation. This latter effect is obtained by heating a precompact at a temperature between 1800° and 2200° C. in an initial stage and then heating it at a temperature between 3000° and 3500° C. while pressuring it sequentially along two or more orthogonal axes so that these develop randomly oriented crystalline formations reduced in size.

What is claimed is:

1. A method of making a composite carbon material, comprising the steps of:
   (a) forming a precompact of granular carbons of different origins;
   (b) heating a localized region of said carbon precompact at a temperature between 1800° and 3500° C. while pressurizing said localized region at a pressure between 500 kg/cm² and 5000 kg/cm² in at least one direction; and
   (c) successively displacing, in a scanning manner, from one portion to another in said carbon precompact, said region subjected to simultaneous heating and pressurization in step (b) so as to controlledly crystallize said carbon precompact and to control the formation of crystalline vacancies therein.

2. The method defined in claim 1 wherein in step (b), said localized region of the carbon precompact is heated impulsively.

3. The method defined in claim 2 wherein said localized region is heated impulsively by applying at least one electrical pulse of high amperage directly through said carbon precompact along said localized region.

4. The method defined in claim 1, claim 2 or claim 3 wherein in step (b), said localized region of the carbon precompact is pressurized impulsively.

5. The method defined in claim 1, claim 2 or claim 3, further comprising the step of applying an ultasonic vibrational energy to said localized region of the carbon precompact.

6. The method defined in claim 5 wherein said ultrasonic vibrational energy is of a frequency between 15 and 50 kHz.

7. The method defined in claim 1, claim 2 or claim 3 wherein said pressure is reduced periodically at an ultrasonic frequency.

8. The method defined in claim 7 wherein said frequency is between 15 and 50 kHz.

9. The method defined in claim 1, further comprising the step of furnishing an aqueous vapor atmosphere to at least said localized region of the carbon precompact subjected to simultaneous heating and pressurization in step (b).

10. The method defined in claim 1, further comprising the step of pressuring said localized region of the carbon precompact sequentially in one direction and at least another direction orthogonal to said one direction.

11. An apparatus for making a composite carbon material, comprising:
    means for retaining a precompact of granular carbons of different origins;
    means for heating a localized region of the carbon precompact at a temperature between 1800 and 3500° C.;
    pressure means for pressurizing said localized region under a pressure between 500 and 5000 kg/cm² while said region is being heated by said heating means; and
    drive means for displacing, in a scanning manner, said localized region of the carbon precompact subjected to the simultaneous heating and pressurization so as to controlledly crystallize said region and to control the formation of crystalline vacancies therein.

12. The apparatus defined in claim 11 wherein said heating means comprises a power supply for passing electrical pulses of high amperage directly through said localized region of the carbon precompact.

13. A method of making a composite carbon material, comprising the steps of:
    (a) forming a precompact of granular carbons of different origins;
    (b) heating a localized region of said carbon precompact at a temperature between 1800° and 3500° C. while pressurizing said localized region at a pressure between 500 kg/cm² and 5000 kg/cm² in at least one direction;
    (c) successively displacing, in a scanning manner, from one portion to another in said carbon precompact, said region of the carbon precompact subjected to simultaneous heating and pressurization in step (b) so as to controlledly crystallize said carbon precompact and to control the formation of crystalline vacancies therein; and
    (d) applying an ultrasonic vibrational energy to said localized region of the carbon precompact.

14. The method defined in claim 13 wherein said ultrasonic vibrational energy is of a frequency between 15 and 50 kHz.

15. The method defined in claim 13 wherein said pressure is reduced periodically at an ultrasonic frequency.

16. The method defined in claim 15 wherein said frequency is between 15 and 50 kHz.

* * * * *